Dec. 23, 1958
H. R. GROEZINGER
2,865,356
REGULATING MECHANISM FOR INJECTION-TYPE
INTERNAL COMBUSTION ENGINES
Filed Aug. 27, 1956
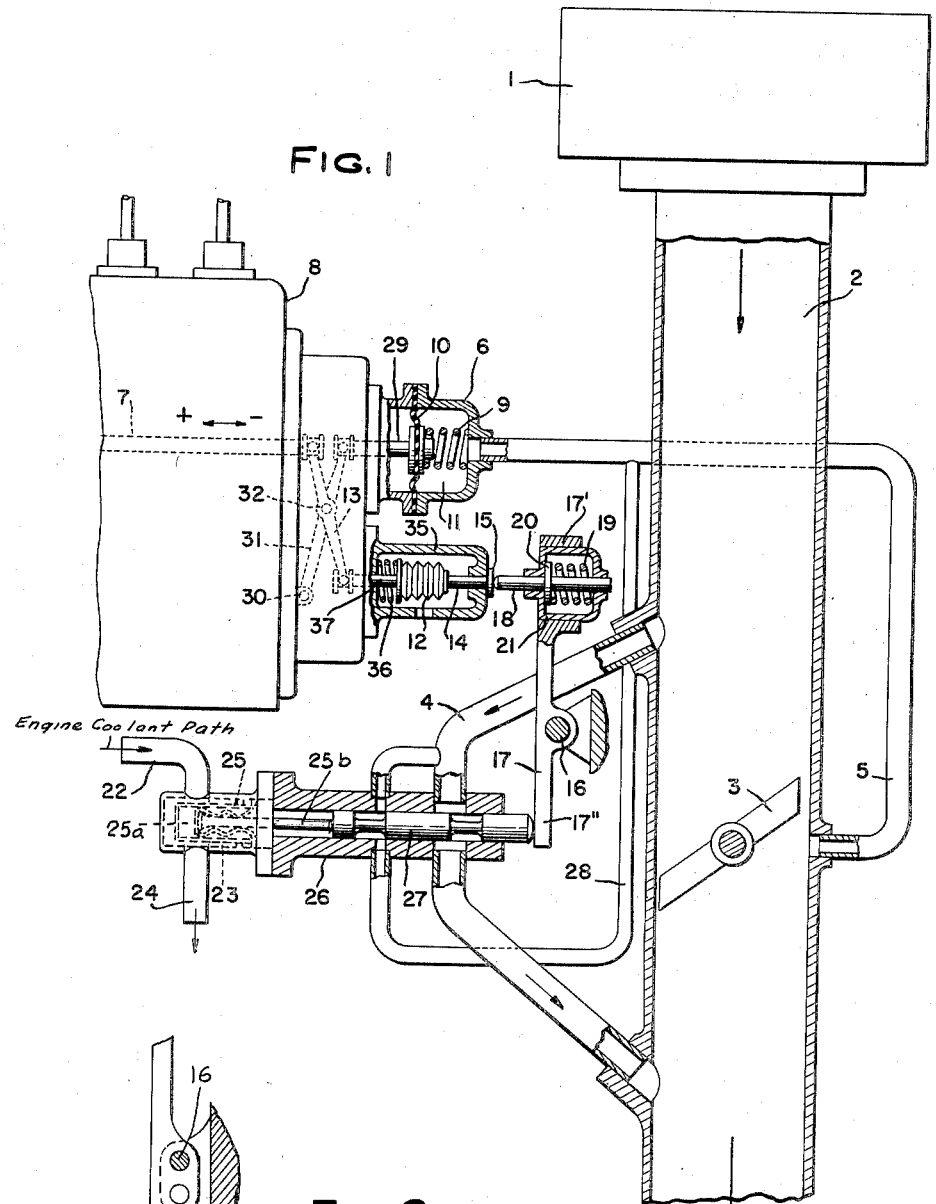
INVENTOR
HANS R. GRÖZINGER
BY *Dicke and Craig*
ATTORNEYS

United States Patent Office 2,865,356
Patented Dec. 23, 1958

2,865,356
REGULATING MECHANISM FOR INJECTION-TYPE INTERNAL COMBUSTION ENGINES

Hans R. Groezinger, Stuttgart-Unterturkheim, Germany, assignor to Daimler-Benz Aktiengesellschaft, Stuttgart-Unterturkheim, Germany Application August 27, 1956, Serial No. 606,401

Claims priority, application Germany August 30, 1955

14 Claims. (Cl. 123—139)

The present invention relates to a regulating arrangement for mixture-compressing gasoline engines of the injection type by the use of a thermostat which is controlled by a fluid medium of the engine, such as the cooling water, the cooling air or the lubricating means, and consists essentially in that the thermostat, on the one hand, adjusts the quantity of the injected fuel in all load ranges of the internal combustion engine, especially by displacement of a cell which adjusts the quantity of fuel to be injected in adaptation to the atmospheric conditions, such as the atmospheric pressure and possibly also the atmospheric temperature, and, on the other, adjusts a throttling or valve member which controls the quantity of idling-speed suction air.

Such a construction and arrangement renders possible that a single thermostat produces the necessary control effects in all load ranges, i. e., during operation of the engine at idling-speed, partial-load and full-load, to provide the larger output thereof by means of a larger idling-speed air quantity necessary for unobjectionable rotation of the engine in the idling speed with a cold engine and accordingly with a more viscous lubricating oil as well as to provide the additional fuel quantity necessary with a cold engine as a result of condensation of the injected fuel on the cylinder walls. Furthermore, an arrangement in accordance with the present invention simultaneously adjusts the additional fuel quantity in accordance with the larger idling-speed suction air quantity.

The present invention also contemplates a refinement of the regulation and adjustment in connection with those arrangements in which the quantity of injected fuel is adjusted with the aid of a vacuum-controlled regulating mechanism which is operatively connected in a well known manner with the suction line or intake manifold of the engine, and attains this refinement in that the thermostat adjusts as a third function thereof a throttling member in a correction air line which is in communication with the vacuum-controlled regulating mechanism or with the connecting line between the vacuum-controlled regulating mechanism and the main suction line for purposes of changing the vacuum which is used to control the regulating mechanism of the fuel injection pump.

Although the adjustment of the injected fuel quantity by means of the atmospheric pressure and/or temperature responsive means, such as a cell of suitable construction, takes place at all engine loads more or less by approximately the same amount, an arrangement in accordance with the present invention, as described above, renders possible that the injected fuel quantity at partial loads, during which a certain amount of vacuum exists in the line system leading to the vacuum-controlled regulating mechanism, may be additionally controlled in such a manner that, for example, an essentially proportional increase of the fuel quantity correction conditioned by the temperature of the cooling water or the like may be achieved which corresponds to the absolute quantity of the injected fuel.

In order to provide the necessary freedom with respect to those temperature ranges within which, on the one hand, the fuel quantity adjustment, and, on the other, the control of the idling-speed air quantity is to take place, the present invention provides a connection between the thermostat and the fuel adjusting member which is formed accordingly as a rod or link system permitting relative movement between certain parts thereof which may be constructed as spring-loaded telescoping or unconnected abutting elements and which cooperates with a stationary or possibly with an adjustable stop or abutment member.

In particular, the arrangement in accordance with the present invention may be so constructed that the thermostat axially displaces a slide valve member which is so constructed as to form a throttling member for the idling-speed air quantity and possibly also for the correction air quantity. The other end of the slide valve member cooperates with one arm of a two-armed lever, preferably having lever arms of unequal length and possibly provided with an adjusting mechanism to adjust the leverage thereof, the second arm of which, through the interposition of a spring, cooperates with or acts on a rod adjustably supported within the housing of the pressure responsive cell, which in turn is connected with the cell and is provided with an abutment to limit the displacement thereof. Such a construction, among others, offers the possibility to adapt in a very simple manner the absolute amount of the fuel quantity correction to the prevailing conditions by changing the leverage ratio of the lever arm.

Accordingly, it is an object of the present invention to provide a control arrangement for mixture-compressing gasoline engines with fuel injection, which is very simple in structure, reliable in operation, and offers excellent operating characteristics as regards the various possibilities of adjustment made possible thereby.

Another object of the present invention resides in the provision of a single thermostat which simultaneously controls the idling-speed air quantity as well as the amount of injected fuel quantity in dependence on the temperature of a fluid medium for the engine, such as the cooling water, the cooling air, or the lubricant of the engine.

Another object of the present invention is to provide a control arrangement in which a single thermostat controls, at all engine loads, the idling-speed air quantity as well as the injected fuel quantity in dependence on the temperature of a fluid medium in the engine, and which is further so arranged that the absolute value of correction produced by a pressure and/or temperature responsive means exposed to the atmosphere is compensated for by the thermostat.

These and other features, objects and advantages of the present invention will become more obvious from the following description when taken in connection with the accompanying drawing, which shows, for purposes of illustration only, one preferred embodiment in accordance with the present invention and one detailed modification.

In the drawing:

Figure 1 is a view partially in cross section of a control arrangement in accordance with the present invention; and Figure 2 shows a modification of part of the apparatus shown in Figure 1.

Referring now more particularly to the drawing, reference numeral 1 designates an air filter of conventional construction for the suction line or intake manifold 2 of an internal combustion engine having fuel injection.

A throttle valve 3 of usual construction is arranged in the suction line 2. An idling-speed air line 4 by-passes the throttle valve 3. While the idling-speed air line 4 is shown in the drawing as connected at both ends thereof on opposite sides of the throttling valve 3, it is understood that the line 4 need only be connected with the main suction line 2 behind the throttling valve 3, i. e., in that part of the suction line 2 located between the throttling valve 3 and the engine itself while the other end may be freely exposed to the atmosphere.

The suction line 2 is tapped in proximity to the throttle valve 3 by the connecting vacuum line 5 leading to the vacuum-controlled regulating mechanism 6 for adjusting the control rod or rack 7 of the injection pump 8. The vacuum-controlled regulating mechanism 6 contains, as is known, a diaphragm member 10 the position of which is determined both by the vacuum existing in the chamber 11 and by the strength of the spring 9. The diaphragm 10 is connected with a rod 29 which in turn is operatively connected with a rod or link member 31 which is pivotally supported at the engine housing as at 30.

The adjustment of the fuel adjusting rack 7 is further controlled by a cell 12 which is in communication with the atmosphere and may be completely or partially evacuated. The pressure and/or temperature responsive cell 12 also exerts a control effect on the position of the fuel adjusting rack 7 by means of a lever 13 which is pivotally supported on the lever 31 at 32 and which is operatively connected at the upper free end thereof with the fuel adjusting rack 7 and at the lower end thereof with the shaft 37 of cell 12. The cell 12 supports itself against an adjustable rod 14 which is adjustably supported in the cell housing 35 and which is provided with an abutment or stop member 15. A two-armed lever 17 which is pivotal about the pivot 16 is provided at one end thereof with an adjustable bolt member 18 which is forced by means of a pre-stressed spring 19 with the abutment 20 thereof against the housing 21 secured in the eye portion 17' formed in one of the two arms of lever 17.

The thermostatic means which may be of any suitable construction is designated in the drawing by reference numeral 25 and is controlled by a fluid medium for the engine such as the cooling water in case of a water-cooled engine, the cooling air in case of an air-cooled engine or the lubricant.

If the engine is a water-cooled engine, as illustrated herein, then a part of the cooling water of the engine is diverted from the main line system and is conducted over a line 22 into the chamber 23 from which it may flow off again over the line 24. The heat sensitive means 25 is located in good heat transfer relationship with the engine cooling water in the chamber 23 and is of such construction that with an increase in temperature the temperature-responsive means in the chamber 25a will expand and move the rod 25b toward the right as viewed in Figure 1 of the drawing and thereby also moves toward the right the axially displaceable slide valve member 27 in the housing 26. The slide valve member 27 abuts with its right end against the arm 17" of the two armed lever 17 which is thereby rotated counterclockwise when the temperature of the fluid medium increases. In addition thereto, the slide valve member 27 controls the cross section of the idling-speed air line 4 and the cross section of a correction air line 28 which branches off from the line 4 and terminates in the connecting vacuum line 5 leading to the vacuum-controlled regulating mechanism 6.

A suitable spring 36 is provided between the housing 35 and the cell 12 normally urging the cell and rod 14 toward the right.

The leverage of lever 17, if so desired, may also be adjustable in any suitable manner, for example, the fulcrum of lever 17 may be shifted by changing the position of the pivot pin 16 as shown in Figure 2.

*Operation*

The operation of the control arrangement in accordance with the present invention is as follows:

With relatively low temperatures of the cooling fluid, namely of the cooling water in the illustrated embodiment flowing through the lines 22 and 24, and, therefore, with a relatively low temperature condition of the entire internal combustion engine, the slide valve member 27 is disposed in a position toward the left to such an extent that the cross section for the idling-speed air line 4 is completely opened. At the same time, the line 28 is completely cut off. If the engine is adjusted to the idling-speed thereof, i. e., if the main throttle valve 3 is closed, such a large amount of idling-speed suction air may flow past the throttle valve 3, on the one hand, and through the idling-speed air line 4, on the other, as is necessary and sufficient for an unobjectionable rotation of the internal combustion engine in spite of the relatively large viscosity of the cold lubricant in the engine. The correspondingly relatively large amount of fuel required for this operating condition, i. e., the amount of fuel required for the increased idling-speed air quantity and for the compensation of the fuel quantity condensed on the cylinder walls with a relatively cold engine, is obtained by the adjustment of the fuel adjusting rack 7 of the fuel injection pump 8 since with a cold engine the lever 17 is rotated about pivot 16 with respect to the position indicated in the drawing in the clockwise direction so that the rod 14 and therewith the cell 12 arrive in a position further to the right than indicated in the drawing while the fuel adjusting rack 7 is thereby moved further to the left than shown in the drawing, in the direction of an increased fuel injection quantity per stroke, the pivot axis 32 at that moment being considered stationary.

This increased injected fuel quantity will also be adjusted, of course, with a cold engine at partial load or full load, i. e., with any position of the throttle valve 3. Consequently, the cooperation between the thermostatic element 25, the slide valve member 27, the lever 17 and the rods 18 and 14, cell 12 and linkage 37, 13 produces a control effect in dependence on the temperature of the fluid medium which is constant for any given temperature of said medium regardless of the adjustment of the control valve 3.

At partial load, a considerable amount of vacuum exists in the vacuum line 5, which, however, with a warmer engine and therewith also with a warmer cooling water is decreased by means of the correction line 28 due to the movement toward the right of the slide valve member 27. This is due to the fact that the correction line 28 varies the amount of vacuum in the line 5 and therewith in the vacuum-controlled regulating mechanism 6 as a function of the amount of opening or throttling in the line 28 produced by the slide valve member 27. As a result thereof, the constant absolute correction, i. e., the decrease of the injected fuel quantity with an increase of the engine temperature which is the same for all load ranges and which takes place as a result of the displacement of the cell 12 by means of the thermostat 25, is approximately proportional to the absolute amounts of the injected fuel quantities per stroke which are controlled essentially over the vacuum line 5.

However, it is understood that the regulating system in accordance with the present invention also functions without the additional correction line 28 which produces this refinement in the regulating adjustments of the regulating mechanism in accordance with the present invention.

With an increase in the temperature of the cooling water, the heat responsive means 25 and therewith the slide valve member 27 move toward the right. For example, at a temperature of 40° C. the position of the elements corresponds to that indicated in the drawing. The abutment member 15 abuts against the housing 35 of the cell 12 which constitutes a fixed abutment so that the possibility for correction of a decrease in the fuel quantity is terminated thereby. However, in this condition a still relatively large amount of air is permitted to pass through the idling-speed air line 4. If the slide valve member 27 moves further to the right as a result of further increases in the cooling water temperature, then, for example, at a temperature of 70° C. of the cooling water temperature, the idling-speed air line 4 is also completely closed.

If the engine is to operate at idling speed with the cooling water temperature at 70° C. or above, then only that amount of suction air is available to the engine which may flow past the throttle valve 3 in the closed position thereof, which, however, is completely adequate with a warm engine to achieve the necessary idling speed output. As a result of the increase in temperature of the cooling water from, for example, 40° C. to 70° C., the lever 17 is also moved in the counterclockwise direction during the movement of the thermostat 25 from the position thereof at 40° C. to the position thereof at 70° C. However, since the abutment member 15 already was in abutment against the housing 35 at a temperature of 40° C., counterclockwise rotation of the lever 17 only produced thereafter a compression of the spring 19 by disengagement of the abutment member 20 from the housing 21.

While I have shown and described one preferred embodiment and one modification in accordance with the present invention, it is understood that the same is not limited thereto but is susceptible of many changes and modifications within the spirit of the present invention, and I intend to cover all such changes and modifications except as defined by the appended claims.

I claim:

1. A control arrangement for an internal combustion engine provided with fuel injection and with a circulatory system through which a fluid medium flows in heat exchange relationship with said engine comprising a regulating mechanism for adjusting the quantity of the injected fuel, thermostatic means exposed to said fluid medium to control said thermostatic means in response to changes in the temperature of said fluid medium and therewith of said engine, conduit means with control means for selectively varying the supply of suction air to said engine, and means for operatively connecting said thermostatic means to said regulating mechanism for adjusting said regulating mechanism in dependence on the temperature of said fluid medium and to said control means for simultaneously adjusting the amount of suction air supplied to said engine through said conduit means in dependence on said temperature.

2. A control arrangement according to claim 1, wherein said control means adjusts the amount of suction air supplied to said engine at the idling-speed thereof.

3. A control arrangement according to claim 2, further comprising means operatively connected to said regulating mechanism and responsive to the atmospheric pressure for adjusting said regulating mechanism in dependence on the atmospheric pressure.

4. A control arrangement according to claim 3, wherein said last-mentioned means is also responsive to the atmospheric temperature.

5. A control arrangement for an internal combustion engine with fuel injection comprising a regulating mechanism controlled by the vacuum in the suction line of said engine for adjusting the quantity of the injected fuel, thermostatic means exposed to a fluid medium in heat exchange relationship with said engine, conduit means with adjustable control means for selectively varying the supply of suction air to said engine, a correction line with adjustable control means and in communication with said regulating mechanism, and means for operatively connecting said thermostatic means with said regulating mechanism for adjusting said regulating mechanism in dependence on the temperature of said fluid medium and with both of said adjustable control means for simultaneously controlling in dependence on said temperature the amount of suction air supplied to said engine through said conduit means at the idling-speed of said engine and the vacuum controlling said regulating mechanism respectively.

6. A control arrangement according to claim 5, wherein a sliding valve member, which is actuated by said thermostatic means constitutes both of said adjustable control means.

7. A control arrangement according to claim 5, further comprising means operatively connected to said regulating mechanism and responsive to atmospheric conditions to adjust said regulating mechanism.

8. A control arrangement according to claim 1, wherein said connecting means includes a link system with relatively movable parts so as to limit the control effect of said thermostatic means on said regulating mechanism.

9. A control arrangement according to claim 5, wherein said connecting means operatively connecting said thermostatic means with said regulating mechanism includes a plurality of links, said links transmitting the control movement from said thermostatic means to said regulating mechanism, one of said links being provided with abutment means adapted to abut against a relatively fixed part of the engine, and two links providing relative movement therebetween to limit the control effect of said thermostatic means upon abutment of said abutment means against said relatively fixed part.

10. A control arrangement according to claim 9 wherein both of said adjustable control means are formed by a single slide valve member extending through said conduit means and correction line and axially displaced by the connection thereof at one end with said thermostatic means, and wherein the other end of said slide valve member is connected with a link of said connecting means.

11. A control arrangement according to claim 10, further comprising cell means responsive to the atmospheric pressure, said cell means being operatively connected at each end thereof with one of said links, a housing for said cell means, one of said links being supported in said housing and being provided with an abutment member to limit the displacement thereof upon abutment with said housing.

12. A control arrangement according to claim 11, wherein said connecting means includes a two-armed lever, said slide valve member abutting at said other end against one arm of said lever, and spring means between said abutment means and the other arm of said lever to connect said lever with said links.

13. A control arrangement according to claim 12 wherein said lever has two unequal lever arms.

14. A control arrangement according to claim 13, further comprising means for adjusting the leverage of said lever.

References Cited in the file of this patent

FOREIGN PATENTS 458,350   Great Britain _____ Dec. 17, 1936